United States Patent
Park

(10) Patent No.: US 7,369,187 B2
(45) Date of Patent: May 6, 2008

(54) LIQUID CRYSTAL DISPLAY DEVICE AND METHOD OF DRIVING THE SAME

(75) Inventor: Joon-Kyu Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 23 days.

(21) Appl. No.: 10/875,566

(22) Filed: Jun. 25, 2004

(65) Prior Publication Data

US 2005/0024547 A1 Feb. 3, 2005

(30) Foreign Application Priority Data

Jul. 30, 2003 (KR) .................... 10-2003-0052591

(51) Int. Cl.
- G02F 1/1343 (2006.01)
- G02F 1/1333 (2006.01)
- G02F 1/136 (2006.01)
- G09G 3/36 (2006.01)

(52) U.S. Cl. .................... 349/38; 349/39; 349/40; 349/41; 345/87; 345/100

(58) Field of Classification Search .................... None
See application file for complete search history.

(56) References Cited

U.S. PATENT DOCUMENTS

| | | | |
|---|---|---|---|
| 5,576,730 A * | 11/1996 | Shimada et al. | 345/98 |
| 5,801,673 A * | 9/1998 | Shimada et al. | 345/100 |
| 6,266,039 B1 * | 7/2001 | Aoki | 345/94 |
| 6,404,414 B2 * | 6/2002 | Ishii | 345/90 |
| 6,493,047 B2 * | 12/2002 | Ha | 349/40 |
| 6,778,158 B2 * | 8/2004 | Sun | 345/87 |
| 2002/0084970 A1 * | 7/2002 | Ozawa | 345/96 |
| 2002/0084971 A1 * | 7/2002 | Youn | 345/99 |
| 2002/0101547 A1 * | 8/2002 | Lee et al. | 349/40 |
| 2004/0263507 A1 * | 12/2004 | Sun | 345/212 |

FOREIGN PATENT DOCUMENTS

| | | |
|---|---|---|
| KR | 1999-0026581 | 4/1999 |
| KR | 2002-0056092 | 7/2003 |

OTHER PUBLICATIONS

S.T. Kim, et al. "A Novel Method of Charge-Recycling TFT-LCD Source Driver for Low-Power Consumption." *IDW*. 1997, pp. 155-158.

* cited by examiner

*Primary Examiner*—David Nelms
*Assistant Examiner*—W. Patty Chen
(74) *Attorney, Agent, or Firm*—Morgan, Lewis & Bockius LLP

(57) ABSTRACT

A liquid crystal display device includes a thin film transistor having a gate electrode, a source electrode and a drain electrode; a data line connected to the source electrode; a gate line connected to the gate electrode; a storage capacitor connected to the drain electrode; a data line capacitor connected to the data line; a first switch connected to the data line; a tank capacitor connected to the first switch; and a common voltage transmission line connected to the tank capacitor to supply a common voltage.

11 Claims, 8 Drawing Sheets

LIQUID CRYSTAL DISPLAY DEVICE AND METHOD OF DRIVING THE SAME

This application claims the benefit of Korean Patent Application No. 2003-52591, filed on Jul. 30, 2003, which is hereby incorporated by reference.

BACKGROUND OF THE INVENTION

1. Field of the Invention

The present invention relates to a liquid crystal display device, and more particularly, to a method of driving a liquid crystal display device with low power consumption.

2. Discussion of the Related Art

Liquid crystal display (LCD) devices display moving images using thin film transistors (TFTs) as a switching element. LCD devices have been widely used for portable applications because of their small size and light weight as compared with cathode ray tubes (CRTs).

FIG. 1 is an equivalent circuit diagram of a liquid crystal display device according to the related art. In FIG. 1, a liquid crystal display (LCD) device 10 includes a timing controller 30, a gray level voltage generator 20, a gate driver 40, a data driver 50 and a liquid crystal panel 60. The timing controller 30 generates several signals for displaying images using a video signal and a synchronous signal of a central process unit (not shown) and supplies the several signals to the gate driver 40 and the data driver 50. The gray level voltage generator 20 provides gray level voltages "$V_1$" to "$V_i$" corresponding to i-gray levels to the data driver 50. For example, when a color data has an 8-bit format, the gray level voltage generator 20 generates gray level voltages "$V_1$" to "$V_{256}$" corresponding to 256-gray levels of $2^8$ driver 40 drives a gate line according to the signal of the timing controller 30 and the data driver 50 drives a data line according to the signal of the timing controller 30.

The liquid crystal panel 60 includes the gate line and the data line crossing each other to define a pixel region. A thin film transistor (TFT) "T" is connected to the gate line and the data line. A liquid crystal capacitor "$C_{LC}$" and a storage capacitor "$C_{ST}$" are connected to the TFT "T." A gate electrode and a source electrode of the TFT "T" are connected to the gate line and the data line, respectively. A pixel electrode (not shown) is connected to a drain electrode of the TFT "T" and the liquid crystal capacitor "$C_{ST}$" is disposed between the pixel electrode and a common electrode (not shown).

For one frame, gate lines are sequentially selected by the gate driver 40 and a gate signal is supplied to the selected gate line. When the gate signal is supplied to the gate electrode of the TFT "T," the TFT "T" is turned on and a channel is generated. In addition, a data signal according to image information is supplied to the data line from the data driver 50 and charges up the liquid crystal capacitor "$C_{LC}$" and the storage capacitor "$C_{ST}$" through the TFT "T." After the TFT "T" is turned off, the data signal applied to the liquid crystal capacitor "$C_{LC}$" and the storage capacitor "$C_{ST}$" is kept. Especially, a voltage of the pixel electrode is kept until the next frame by the storage capacitor "$C_{ST}$."

The LCD device 10 displays images by modulating liquid crystal molecules according to the data signal applied to the liquid crystal capacitor "$C_{LC}$" and the storage capacitor "$C_{ST}$." If the data signal modulating the liquid crystal molecules has the same polarity through the frames, the liquid crystal molecules may deteriorate, thereby degrading the display quality. The problems of deterioration of the liquid crystal molecules can be solved by a data inversion driving method, where the data signal has an opposite polarity in every frame.

The data inversion driving method may be classified into a line inversion method, a column inversion method, or a dot inventions method. In a line inversion driving method, the data signals having a positive (+) polarity and a negative (−) polarity are alternately supplied according to the gate line. Accordingly, a voltage of a pixel electrode connected to an even gate line has an opposite polarity to a voltage of a pixel electrode connected to an odd gate line. In a column inversion driving method, the data signals having a positive (+) polarity and a negative (−) polarity are alternately supplied according to the data line. Accordingly, a voltage of a pixel electrode connected to an even data line has an opposite polarity to a voltage of a pixel electrode connected to an odd data line. In a dot inversion driving method, the data signals are supplied such that voltages of the adjacent pixel electrodes along a horizontal direction and a vertical direction have opposite polarities to each other. A dot inversion driving method is combination of a line inversion driving method and a column inversion driving method. Among these data inversion driving methods, the dot inversion driving method is widely used because of its superior display quality and minimization of flicker.

FIGS. 2A and 2B are schematic views showing a polarity of a pixel electrode in adjacent two frames when a liquid crystal display device is driven by a dot inversion driving method according to the related art. As shown in FIGS. 2A and 2B, a pixel electrode having a positive (+) polarity in a frame has a negative (−) polarity in the next frame, and vice versa. In addition, adjacent pixel electrodes have opposite polarities to each other in each frame. When an LCD device is driven by a dot inversion driving method, a common voltage of a fixed value is supplied to a common electrode. Accordingly, a data driver 50 (of FIG. 1) alternately outputs data signals having a positive (+) polarity and a negative (−) polarity with the common voltage as a central value in every frame.

FIG. 3 is an equivalent circuit diagram of a liquid crystal display device driven by a dot inversion driving method according to the related art, and FIG. 4 is a timing chart showing waveforms of a data signal output from a data driver of FIG. 2.

In FIG. 3, a liquid crystal panel 60 includes a data line resistor "$R_L$" and a data line capacitor "$C_L$." The data line resistor "$R_L$" represents a substantial resistor of a data line and the data line capacitor "$C_L$" represents a total parasitic capacitor between a data line and an adjacent data line and between a data line and a gate line. Although not shown in FIG. 2, a storage capacitor "$C_{ST}$" is connected to the data line capacitor "$C_L$" through a TFT when a gate signal is supplied to the TFT through a gate line. A data driver 50 is connected to the liquid crystal panel 60 through a data line "$DL_1$" to "$DL_{m+2}$."

In FIG. 4, a data signal has upper and lower waveforms with respect to a common voltage "$V_{COM}$" such that a pixel electrode has one of positive (+) and negative (−) polarities. When a data signal higher than the common voltage "$V_{COM}$" is supplied to an $m^{th}$ data line "$DL_m$," a data signal lower than the common voltage "$V_{COM}$" is supplied to an $(m+1)^{th}$ data line "$DL_{m+1}$." Accordingly, adjacent pixel electrodes connected the same gate line have opposite polarities to each other. In addition, if a data signal higher than the common voltage "$V_{COM}$" is supplied to a pixel electrode connected to an $n^{th}$ gate line, a data signal lower than the common voltage "$V_{COM}$" is supplied to a pixel electrode connected to an (n+1)th gate line. As a result, adjacent pixel electrodes of the liquid crystal panel 60 (of FIG. 2) along a horizontal direction and a vertical direction have opposite polarities to each other.

Referring to FIGS. 3 and 4, a first time period "$t_1$," represents a driving time periods such that a gate signal is supplied to an $n^{th}$ gate line from the gate driver and a second time period "$t_2$" represents a driving time period such that a gate signal is supplied to an $(n+1)^{th}$ gate line from the gate driver. A data driver 50 outputs data signals. When a gate signal is supplied to an $n^{th}$ gate line during the first time period "$t_1$," a data signal of $V_{COM}-V_S/2$ is supplied to an $m^{th}$ data line "$DL_m$" and a data signal of $V_{COM}+V_S/2$ is supplied to an $(m+1)^{th}$ data line "$DL_{m+1}$," Next, when a gate signal is supplied to an $(n+1)^{th}$ gate line during the second time period "$t_2$," a data signal of $V_{COM}+V_S/2$ is supplied to an $m^{th}$ data line "$DL_m$" and a data signal of $V_{COM}-V_S/2$ is supplied to an $(m+1)^{th}$ data line "$DL_{m+1}$," Accordingly, a data signal swing is obtained from difference between two data signals such that $(V_{COM}+V_S/2)-(V_{COM}-V_S/2)=V_S$. Since the data driver 50 outputs a data signal having a swing of about $V_S$ whenever the gate signal is supplied to the gate line, an LCD device driven by a dot inversion driving method has a high power consumption.

FIG. 5 is an equivalent circuit diagram of a liquid crystal display device having a charge-sharing unit according to the related art. In FIG. 5, a charge-sharing unit 170 including an amplifier "AMP" and a switch "SW" is disposed between a data driver 150 and a liquid crystal panel 160. The amplifier "AMP" and the switch "SW" are connected to an amplifier control terminal "A" and a switch control terminal "B," respectively. The amplifier "AMP" amplifies a data signal output from the data driver 150. In addition, the switch "SW" connects adjacent data lines "$DL_1$" to "$DL_{m+2}$" for a predetermined time period, thereby sharing charges of the adjacent data lines "$DL_1$" to "$DL_{m+2}$."

FIG. 6 is a timing chart showing a data signal output from a data driver and a switch control signal of a switch control terminal of FIG. 5. In FIG. 6, a first time period "$t_1$" represents a driving time periods such that a gate signal is supplied to an $n^{th}$ gate line from the gate driver and a second time period "$t_2$" represents a driving time period such that a gate signal is supplied to an $(n+1)^{th}$ gate line from the gate driver. In addition, a third time period "$t_3$" and a fourth time period "$t_4$" represent partial time periods of the first and second time periods such that a switch control signal is supplied to a switch control terminal "B" to turn on a switch "SW," respectively. In other words, the third and fourth time period represent a pre-charging time period or a charge-sharing time period.

Referring to FIGS. 5 and 6, when a gate signal is supplied to an $n^{th}$ gate line during the first time period "$t_1$," a data signal of $V_{COM}+V_S/2$ is supplied to an $(m+1)^{th}$ data line "$DL_{m+1}$," and a data signal of $V_{COM}-V_S/2$ is supplied to an $(m+2)^{th}$ data line "$DL_{m+2}$" to charge up a data line capacitor "$C_L$." Next, when a gate signal is supplied to an $(n+1)^{th}$ gate line during the second time period "$t_2$," a switch control signal is supplied to the switch control terminal "B" during the fourth time period "$t_4$" to turn on the switch "SW." Accordingly, the $(m+1)^{th}$ data line "$DL_{m+1}$" and the $(m+2)^{th}$ data line "$DL_{m+2}$" are connected to each other for pre-charging. When the switch "SW" is turned on, the $(m+1)^{th}$ data line "$DL_{m+1}$" and the $(m+2)^{th}$ data line "$DL_{m+2}$" are connected to each other in parallel. Thus, the data line capacitors "$C_L$" share charges with each other, thereby having the common voltage "$V_{COM}$" instantaneously. During the fourth time period "$t_4$," since the gate signal is supplied to the $(n+1)^{th}$ gate line, the data line capacitors "$C_L$" share charges with the storage capacitor "$C_{ST}$" connected to the $(n+1)^{th}$ gate line.

In general, since capacitance of the data line capacitors "$C_L$" is about 50 times as large as that of the storage capacitor "$C_{ST}$," the storage capacitor "$C_{ST}$" has approximately the common voltage "$V_{COM}$" of the data line capacitors "$C_L$." Therefore, during the fourth time period "$t_4$," the data line capacitors "$C_L$" and the storage capacitor "$C_{ST}$" share charges with each other, and therefore, the storage capacitor "$C_{ST}$" approximately has the common voltage "$V_{COM}$." Next, the data driver 150 outputs a data signal of $V_{COM}-V_S/2$ to the $(m+1)^{th}$ data line "$DL_{m+1}$" and a data signal of $V_{COM}+V_S/2$ to the $(m+2)^{th}$ data line "$DL_{m+2}$." Since the data lines "$DL_1$" to "$DL_{m+2}$" have a value of the common voltage "$V_{COM}$" before the data signal is output, a data signal swing is obtained from difference between the data signal and the common voltage such that $V_{COM}-(V_{COM}-V_S/2)=V_S/2$ or $V_{COM}-(V_{COM}+V_S/2)=-V_S/2$.

In an LCD device having a charge-sharing unit 170, since the data driver 150 outputs a data signal having a swing of about $V_S/2$ for changing polarity of the pixel electrode, the LCD device may be driven by a dot inversion driving method with a relatively low power consumption. However, an additional external driving circuit is required to supply a common voltage "$V_{COM}$" to a data line capacitor "$C_L$." The additional external driving circuit makes the fabrication process complicated and causes increase of production cost.

SUMMARY OF THE INVENTION

Accordingly, the present invention is directed to a liquid crystal display device and a method of driving a liquid crystal display device that substantially obviate one or more of the problems due to limitations and disadvantages of the related art.

An object of the present invention is to provide a liquid crystal display device and a method of driving a liquid crystal display device that reduces power consumption without an additional external circuit.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a thin film transistor having a gate electrode, a source electrode and a drain electrode; a data line connected to the source electrode; a gate line connected to the gate electrode; a storage capacitor connected to the drain electrode; a data line capacitor connected to the data line; a first switch connected to the data line; a tank capacitor connected to the first switch; and a common voltage transmission line connected to the tank capacitor to supply a common voltage.

In another aspect, a method of driving a liquid crystal display device comprises charging a tank capacitor with a common voltage; pre-charging a data line capacitor connected to a data line with the common voltage by connecting the data line to the tank capacitor electrically; and pre-charging a storage capacitor connected to the data line with the common voltage by connecting the data line to the storage capacitor electrically.

In another aspect, a method of driving a liquid crystal display device comprises sharing first charges stored in a tank capacitor with a data line capacitor connected to the tank capacitor through a first switch during a first time period; sharing second charges stored in the data line capacitor with a storage capacitor connected to the data line capacitor through a thin film transistor during a second time period; applying a data signal to the storage capacitor for a third time period; and applying a common voltage to the tank capacitor during a fourth time period.

In another aspect, A liquid crystal display device comprises a color filter substrate; a thin film transistor substrate, the thin film transistor substrate defining a plurality of pixel regions, each pixel region associated with a thin film transistor having a gate electrode, a source electrode and a drain electrode, a data line connected to the source electrode of the thin film transistor, a gate line connected to the gate electrode of the thin film transistor, a storage capacitor connected to the drain electrode of the thin film transistor, a data line capacitor connected to the data line, a first switch connected to the data line; a tank capacitor connected to the first switch, and a common voltage supply connected to the tank capacitor; and a liquid crystal material disposed between color filter substrate and the thin film transistor substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 2A and 2B are schematic views showing a polarity of a pixel electrode in adjacent two frames when a liquid crystal display device is driven by a dot inversion driving method according to the related art;

Figure 9A:
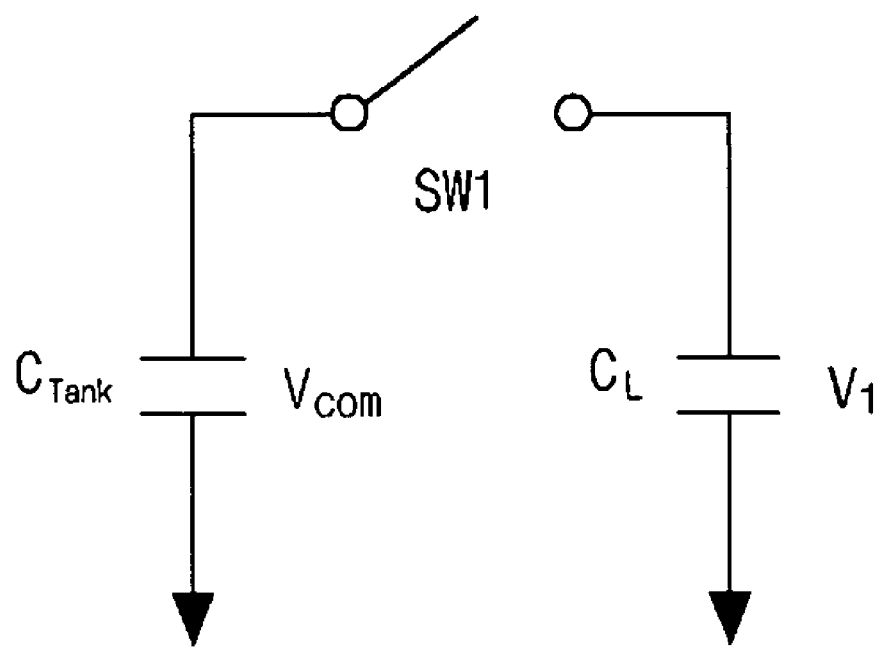
Figure 9B:
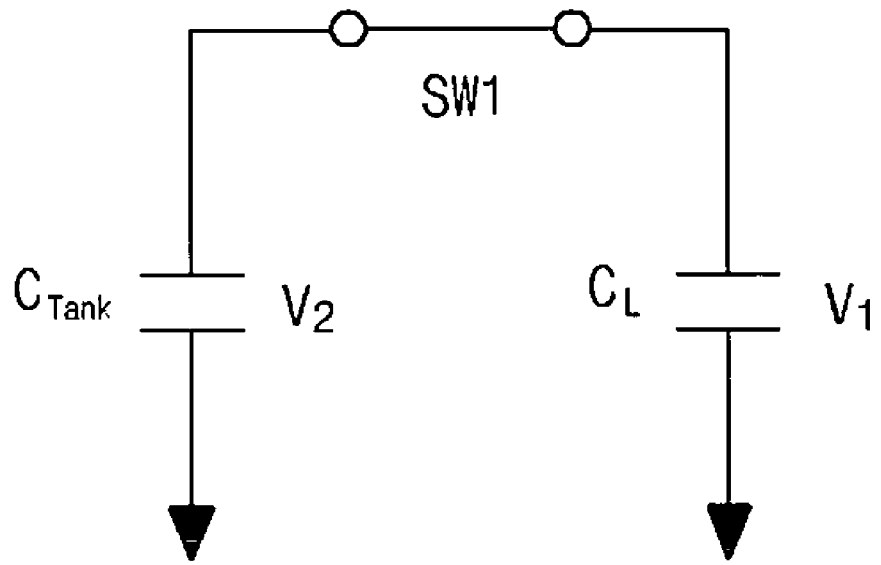
Figure 10A:
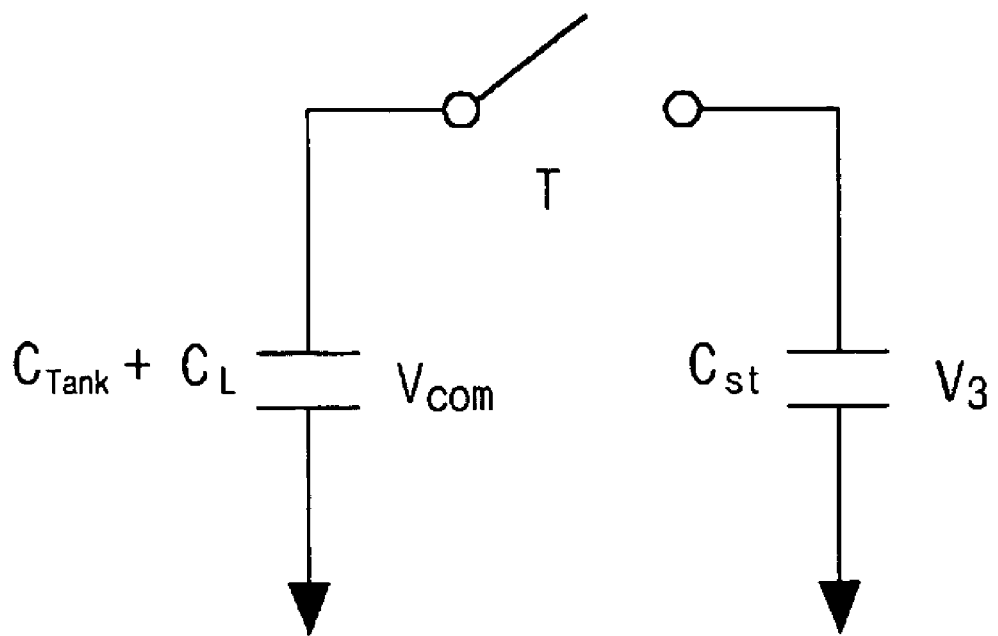
Figure 10B:
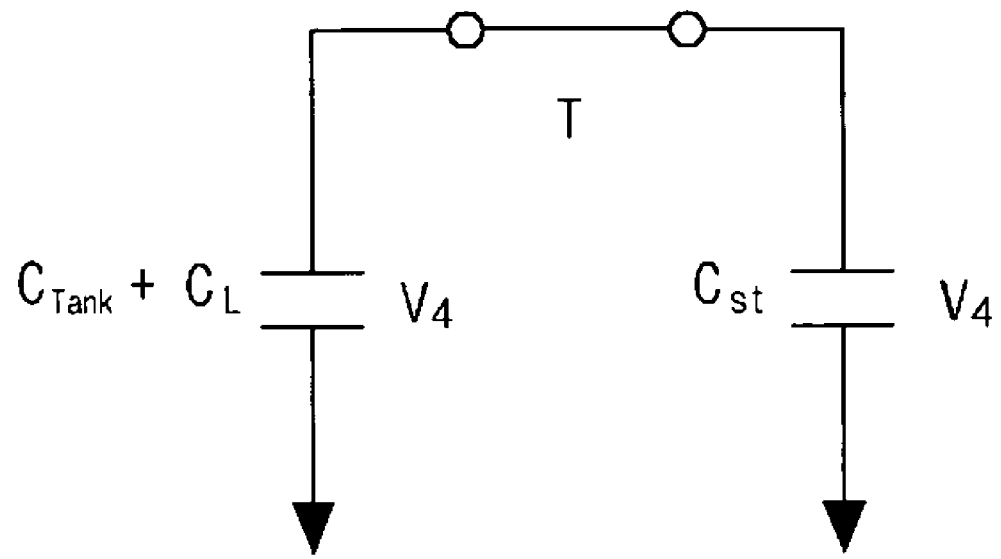

FIG. is a timing chart showing a data signal, a gate signal, a first switch control signal and a second control signal for a liquid crystal display device according to an embodiment of the present invention;

FIGS. 9A and 9B are equivalent circuit diagrams illustrating pre-charging between a tank capacitor and a data line capacitor of a liquid crystal display device according to an embodiment of the present invention; and FIGS. 10A and 10B are equivalent circuit diagrams illustrating pre-charging among a tank capacitor, a data line capacitor and a storage capacitor of a liquid crystal display device according to an embodiment of the present invention.

DETAILED DESCRIPTION OF THE PREFERRED EMBODIMENTS

Reference will now be made in detail to preferred embodiments of the present invention, examples of which are illustrated in the accompanying drawings. Wherever possible, similar reference numbers will be used throughout the drawings to refer to the same or like parts.

Figure 1:
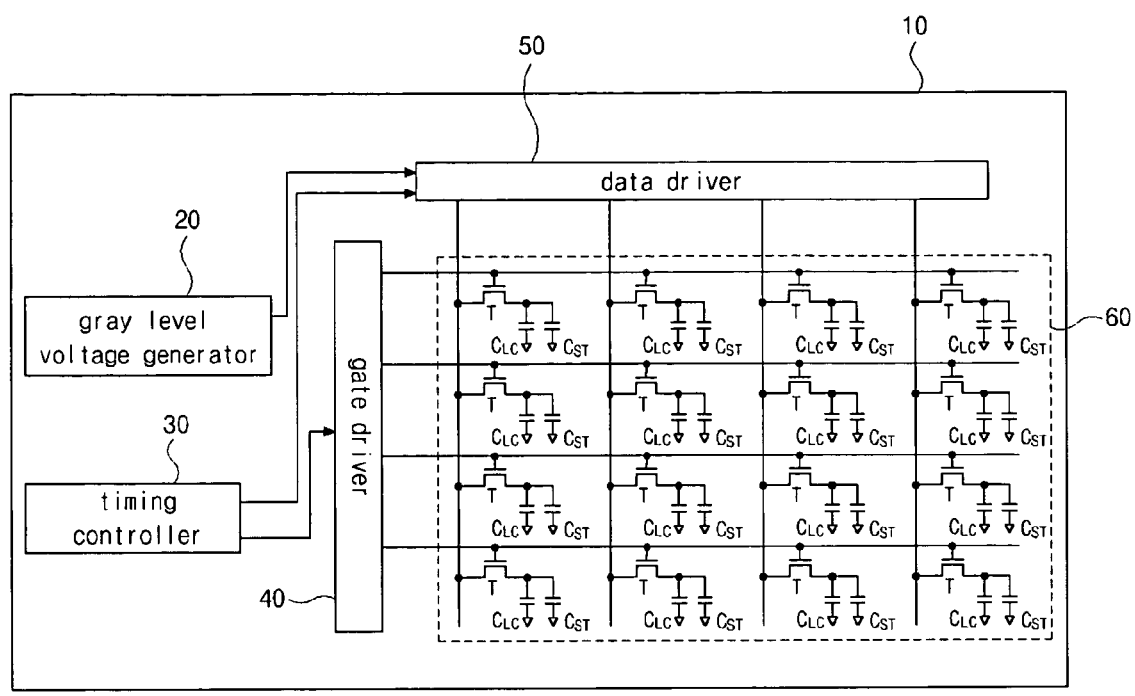
FIG. 1 is an equivalent circuit diagram of a liquid crystal display device according to the related art.
Figure 3:
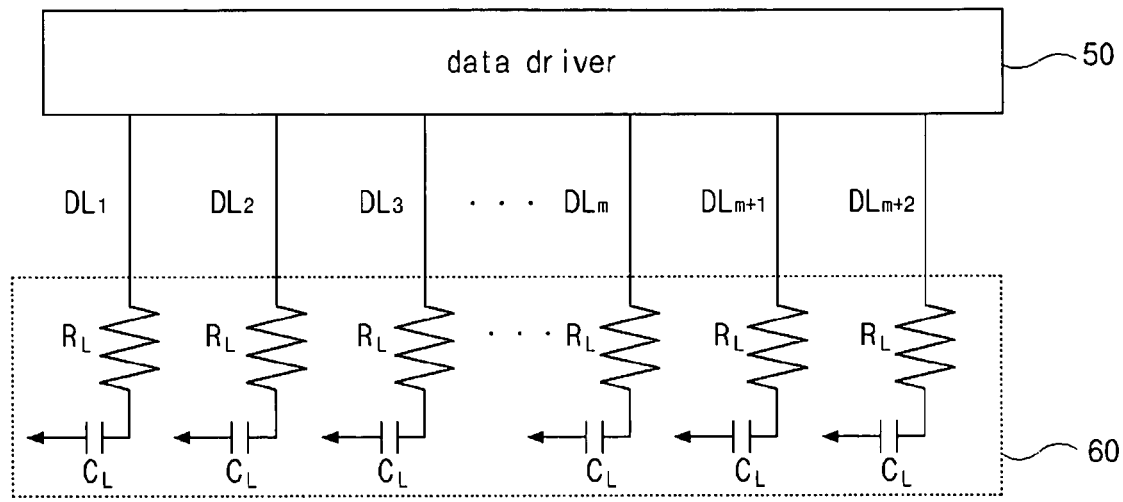
FIG. 3 is an equivalent circuit diagram of a liquid crystal display device driven by a dot inversion driving method according to the related art.
Figure 4:
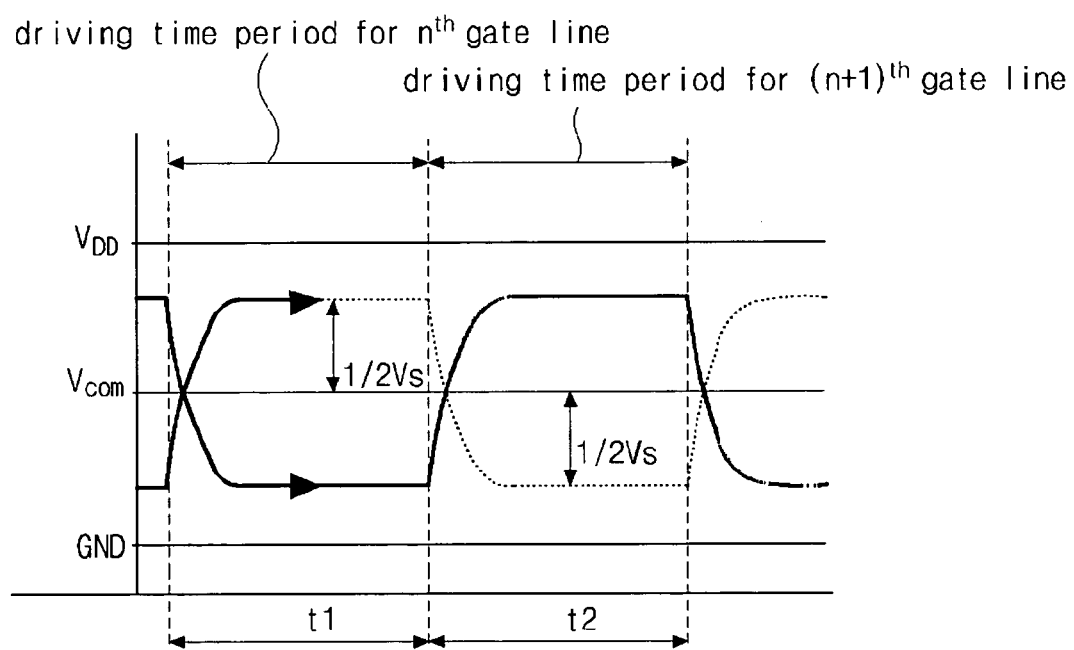
FIG. 4 is a timing chart showing waveforms of a data signal output from a data driver of FIG. 2.
Figure 5:
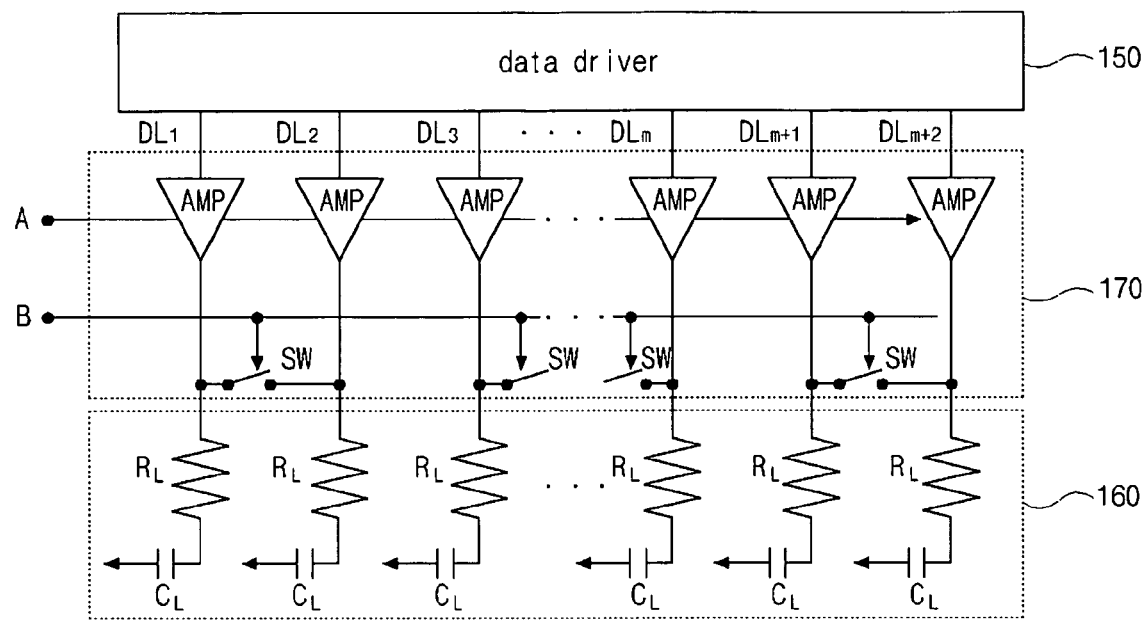
FIG. 5 is an equivalent circuit diagram of a liquid crystal display device having a charge-sharing unit according to the related art.
Figure 6:
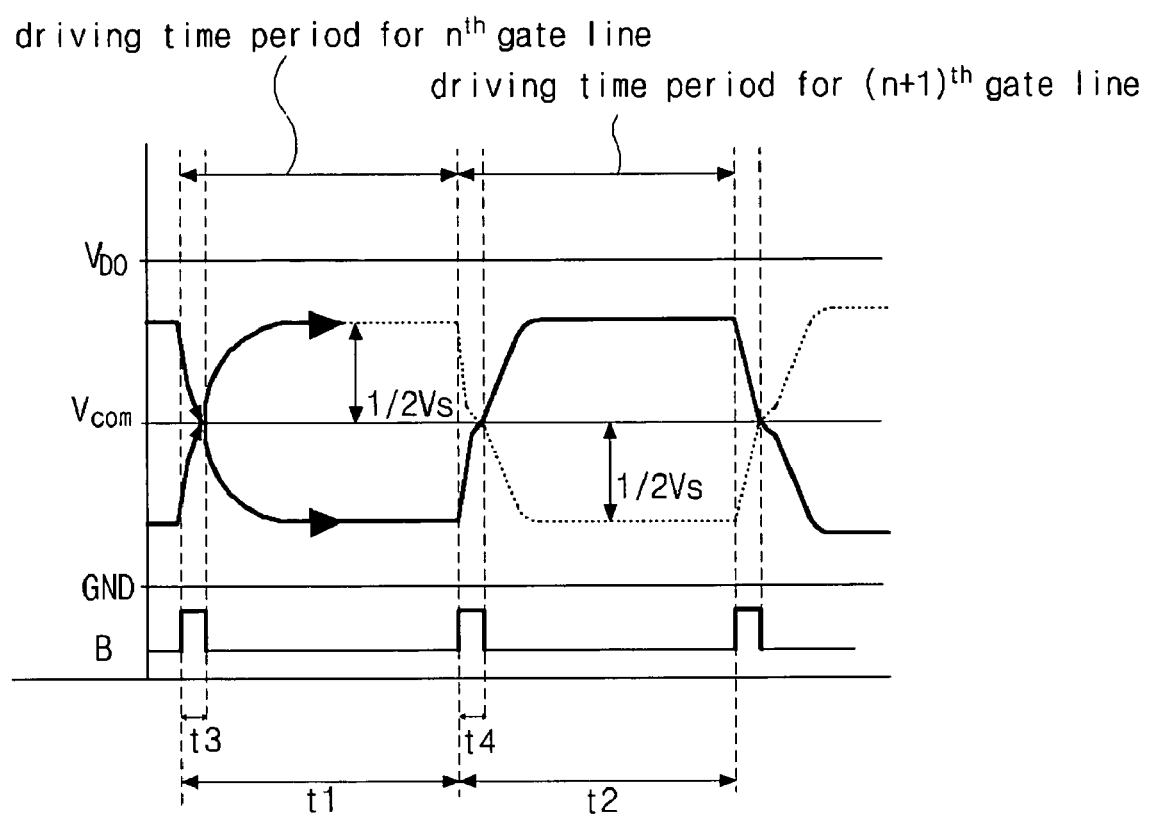
FIG. 6 is a timing chart showing a data signal output from a data driver and a switch control signal of a switch control terminal of FIG. 5.
Figure 7:
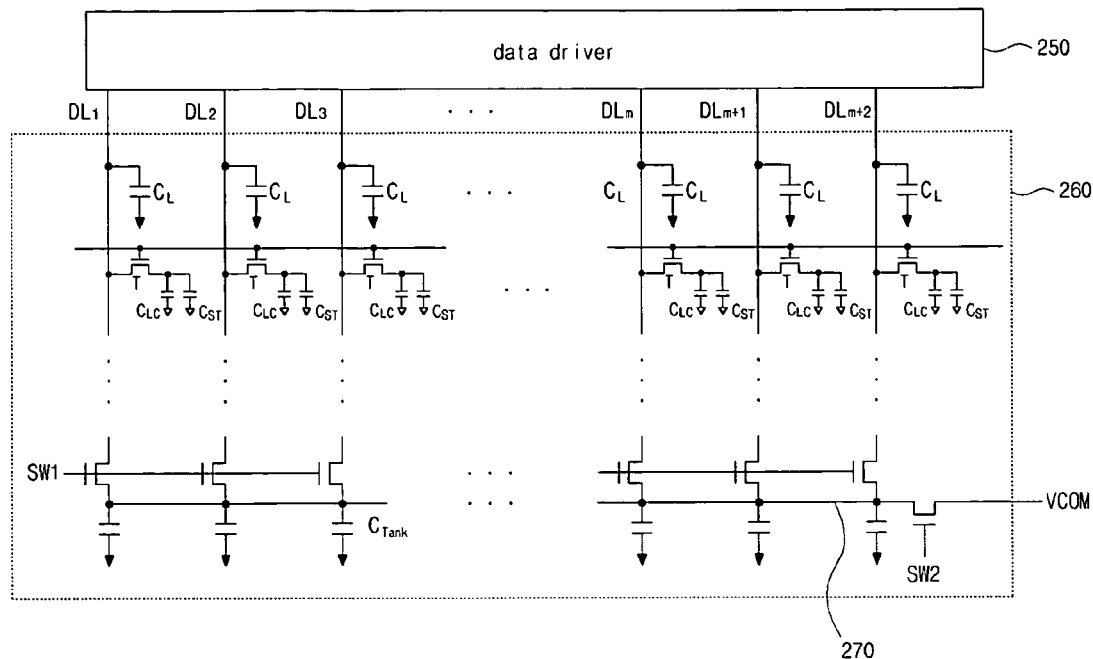
FIG. 7 is an equivalent circuit diagram of a liquid crystal display device according to an embodiment of the present invention.

FIG. 7 is an equivalent circuit diagram of a liquid crystal display device according to an embodiment of the present invention. In FIG. 7, a liquid crystal display device includes a liquid crystal panel 260 and a data driver 250 supplying a data signal to a data line "$DL_1$" to "$DL_{m+2}$" of the liquid crystal panel 260. Although not shown in FIG. 7, the LCD device further includes a gate driver sequentially supplying a gate signal to a gate line of the liquid crystal panel 260. The liquid crystal panel 260 includes a data line capacitor "$C_L$," a tank capacitor "$C_{TANK}$," a first switch "$SW_1$" and a second switch "$SW_2$." The data line capacitor "$C_L$" represents a total parasitic capacitor connected to a data line "$DL_1$" to "$DL_{m+2}$" and the tank capacitor "$C_{TANK}$" supplies a common voltage "$V_{COM}$" to a data line "$DL_1$" to "$DL_{m+2}$." The first and second switches "$SW_1$" and "$SW_2$" adjust application of a common voltage "$V_{COM}$" to the data line capacitor "$C_L$" and the tank capacitor "$C_{TANK}$," respectively.

In FIG. 7, a thin film transistor (TFT) including a gate electrode, a source electrode and a drain electrode is formed in each pixel region defined by the gate line and the data line "$DL_1$" to "$DL_{m+2}$." The gate electrode is connected to the gate line and the source electrode is connected to the data line "$DL_1$" to "$DL_{m+2}$." In addition, a storage capacitor connected to the drain electrode stores the data signal until the next frame. A common voltage source supplies the common voltage "$V_{COM}$" to the liquid crystal panel 260.

The tank capacitor "$C_{TANK}$" stores the common voltage "$V_{COM}$" supplied through the second switch "$SW_2$" from the common voltage source. When the first switch "$SW_1$" is turned on, the data line capacitor "$C_L$" is connected to the tank capacitor "$C_{TANK}$." In other words, when the first and second switches "$SW_1$" and "$SW_2$" are turned on, the common voltage "$V_{COM}$" is stored in the data line capacitor "$C_L$" and the tank capacitor "$C_{TANK}$."

Figure 8:
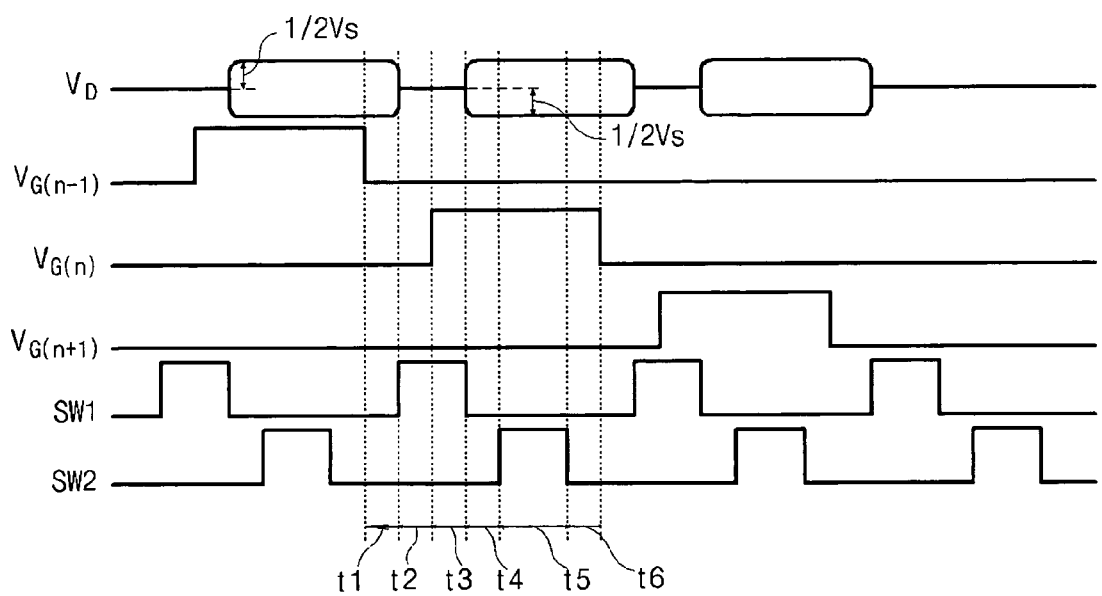

FIG. 8 is a timing chart showing a data signal, a gate signal, a first switch control signal, and a second control signal for a liquid crystal display device according to an embodiment of the present invention.

In FIG. 8, a data signal "$V_D$" may be output from a data driver and stored in a data line capacitor "$C_L$" during a first time period "$t_1$" directly after a gate signal "$V_{G(n-1)}$" stops being output to an $(n-1)^{th}$ gate line. The data signal "$V_D$" may have one of a positive (+) polarity and a negative (−) polarity with respect to the common voltage "$V_{COM}$." For example, a data signal of $V_{COM}+V_S/2$ may be supplied to an $m^{th}$ data line "$DL_m$" and a data signal of $V_{COM}-V_S/2$ is supplied to an $(m+1)^{th}$ data line "$DL_{m+1}$" to charge up a data line capacitor "$C_L$." Next, during second and third time periods "$t_2$" and "$t_3$," the data signal "$V_D$" is not output to the data line "$DL_1$" to "$DL_{m+2}$" and the common voltage "$V_{COM}$" is stored in the data line capacitor "$C_L$," the storage capacitor "$C_{ST}$" and the tank capacitor "$C_{TANK}$." Since the first switch "$SW_1$" is turned on during the second time period "$t_2$," the tank capacitor "$C_{TANK}$" is connected to the data line capacitor "$C_L$" and pre-charging (or charge-sharing) between the tank capacitor "$C_{TANK}$" and the data line capacitor "$C_L$" occurs.

FIGS. 9A and 9B are equivalent circuit diagrams illustrating pre-charging between a tank capacitor and a data line capacitor of a liquid crystal display device according to an embodiment of the present invention.

In FIG. 9A, when a first switch "$SW_1$" is turned off, a common voltage "$V_{COM}$" is stored in a tank capacitor "$C_{TANK}$" and a data signal "$V_D$" is stored in a data line capacitor "$C_L$."

As shown in FIG. 9B, the first switch "$SW_1$" is turned on during a second time period "$t_2$." Since the tank capacitor "$C_{TANK}$" is electrically connected to the data line capacitor "$C_L$," the tank capacitor "$C_{TANK}$" and the data line capacitor "$C_L$" share charges stored therein with each other (charge-sharing or pre-charging). Accordingly, the tank capacitor "$C_{TANK}$" and the data line capacitor "$C_L$" may have a first balance voltage "$V_2$." The first balance voltage "$V_2$" may be obtained from equation (1):

$$V_2 = (C_{TANK} \times V_{COM} + C_L \times V_D)/(C_{TANK} + C_L) \quad (1)$$

Capacitance of the tank capacitor "$C_{TANK}$" may be designed to be about 50 times as large as that of the data line capacitor "$C_L$." For example, the capacitances of the tank capacitor "$C_{TANK}$" and the data line capacitor "$C_L$" may be about 50 pF and about 10 pF, respectively. Accordingly, the first balance voltage "$V_2$" may become the common voltage "$V_{COM}$" by approximation of equation (1) above as follows:

$$V_2 = (C_{TANK} \times V_{COM} + C_L \times V_D)/(C_{TANK} + C_L)$$
$$\approx (C_{TANK} \times V_{COM} + C_L \times V_D)/C_{TANK}$$
$$\approx V_{COM} + (C_L/C_{TANK}) \times V_D$$
$$\approx V_{COM}$$

Therefore, when the first switch "$SW_1$" is turned on, the common voltage "$V_{COM}$" stored in the tank capacitor "$C_{TANK}$" charges up the data line capacitor "$C_L$."

During a third time period "$t_3$" directly after the second time period "$t_2$," a gate signal "$V_{G(n)}$" is supplied to an $n^{th}$ gate line and thin film transistors connected to the $n^{th}$ gate line are turned on. Accordingly, a storage capacitor "$C_{ST}$" is electrically connected to the data line capacitor "$C_L$." That is, since the first switch "$SW_1$" is turned on during the third time period "$t_3$," the data line capacitor "$C_L$" is electrically connected to the tank capacitor "$C_{TANK}$." Therefore, during the third time period "$t_3$," the storage capacitor "$C_{ST}$," the data line capacitor "$C_L$" and the tank capacitor "$C_{TANK}$" are electrically connected to each other and pre-charging (charge-sharing) occurs among the storage capacitor "$C_{ST}$," the data line capacitor "$C_L$" and the tank capacitor "$C_{TANK}$."

FIGS. 10A and 10B are equivalent circuit diagrams illustrating pre-charging among a tank capacitor, a data line capacitor and a storage capacitor of a liquid crystal display device according to an embodiment of the present invention.

In FIG. 10A, a tank capacitor "$C_{TANK}$" and a data line capacitor "$C_L$" may be charged up with a first balance voltage "$V_2$" approximating to a common voltage "$V_{COM}$" during a second time period "$t_2$." Since a thin film transistor (TFT) "T" connected to an $n_{th}$ gate line is turned off during the second time period "$t_2$," a previous data signal "$V_3$" of previous frame is stored in a storage capacitor "$C_{ST}$."

As shown in FIG. 10B, a gate signal "$V_{G(n)}$" is supplied to the $n^{th}$ gate line and the TFT "T" connected to the $n^{th}$ gate line is turned on. Since the tank capacitor "$C_{TANK}$," the data line capacitor "$C_L$" and the storage capacitor "$C_{ST}$" is electrically connected to each other, the tank capacitor "$C_{TANK}$," the data line capacitor "$C_L$" and the storage capacitor "$C_{ST}$" share charges stored therein with each other (charge-sharing or pre-charging). Accordingly, the tank capacitor "$C_{TANK}$," the data line capacitor "$C_L$" and the storage capacitor "$C_{ST}$" may have a second balance voltage "$V_4$." The second balance voltage "$V_4$" may be obtained from equation (2):

$$V_4 = ((C_{TANK} + C_L) \times V_{COM} + C_{ST} \times V_3)/((C_{TANK} + C_L) + C_{ST}) \quad (2)$$

Capacitance of the storage capacitor "$C_{ST}$" may be designed to be about 1000 times as small as those of the tank capacitor "$C_{TANK}$" and the data line capacitor "$C_L$." Accordingly, the second balance voltage "$V_4$" may become the common voltage "$V_{COM}$" by approximation of equation (2) above as follows:

$$V_2 = ((C_{TANK} + C_L) \times V_{COM} + C_{ST} \times V_3)/((C_{TANK} + C_L) + C_{ST})$$
$$\approx ((C_{TANK} + C_L) \times V_{COM} + C_{ST} \times V_3)/(C_{TANK} + C_L)$$
$$\approx V_{COM} + (C_L/(C_{TANK} + C_L)) \times V_D$$
$$\approx V_{COM}$$

Therefore, the common voltage "$V_{COM}$" may charge the storage capacitor "$C_{ST}$" during the third time period "$t_3$." After the third time period "$t_3$," the first switch "$SW_1$" is turned off and the pre-charging due to the tank capacitor "$C_{TANK}$" is terminated.

Referring again to FIGS. 7 and 8, the data driver 250 supplies the data signals "$V_D$" to the data lines "$DL_1$" to "$DL_{m+2}$" during a fourth time period "$t_4$." Since the adjacent data signals have opposite polarities to each other, the data driver 250 outputs a data signal of $V_{COM} - V_S/2$ to the $m^{th}$ data line "$DL_m$" and a data signal of $V_{COM} + V_S/2$ to the $(m+1)^{th}$ data line "$DL_{m+1}$." Since the data lines "$DL_1$" to "$DL_{m+2}$" have a value of the common voltage "$V_{COM}$" before the data signals are output, a data signal swing is obtained from difference between the data signal and the common voltage such that $V_{COM} - (V_{COM} - V_S/2) = V_S/2$ or $V_{COM} - (V_{COM} + V_S/2) = -V_S/2$. Thus, the data driver 250 of the LCD device having the tank capacitor "$C_{TANK}$" may supply a data signal having an absolute value of about $V_S/2$ according to the polarity.

During a fifth time period "$t_5$," the second switch "$SW_2$" is turned on and the common voltage "$V_{COM}$" from the common voltage source is stored in the tank capacitor "$C_{TANK}$" through a common voltage transmission line 270, thereby causing the tank capacitor "$C_{TANK}$" to maintain the common voltage "$V_{COM}$" throughout all frames. Although the second switch "$SW_2$" is turned off after the fifth time period "$t_5$," the gate signal "$V_{G(n)}$" and the data signal "$V_D$" are supplied to the gate line and the data line, respectively, during a sixth time period "$t_6$." After the sixth time period "$t_6$," the above procedure is repeated to display images with reduced power consumption.

In the LCD device according to the present invention, the tank capacitor is connected to the data line. Before the data driver supplies the data signal to the data line, the tank capacitor, the data line capacitor and the storage capacitor are charged up with the common voltage through precharging (or charge-sharing). Accordingly, the data signal swing is reduced and the power consumption of the data driver and the LCD device is also reduced. In addition, since an additional external driving circuit for pre-charging (charge-sharing) is not required, production cost is reduced and driving circuit of the LCD device is simplified.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a plurality of thin film transistors arranged in a matrix form, each transistor having a gate electrode, a source electrode and a drain electrode;
a plurality of data lines such that each data line is connected to the respective source electrodes of the transistors of a corresponding column of the matrix form;
a plurality of gate lines such that each gate line is connected to the respective gate electrodes of the transistors of a corresponding row of the matrix form;
a plurality of storage capacitors each connected to the drain electrode of a respective transistor;
a plurality of data line capacitors respectively connected to the data lines;
a plurality of first switches respectively connected to the data lines;
a plurality of tank capacitors respectively connected to corresponding ones of the first switches of each one of the data lines;
a common voltage transmission line connected between the tank capacitors and the respective switches to supply a common voltage; and
a second switch directly connected to the common voltage transmission line.

2. The liquid crystal display device according to claim 1, wherein each data line capacitor is a parasitic capacitor of the respective data line.

3. The liquid crystal display device according to claim 1, wherein a capacitance of each tank capacitor is about 50 times larger than a capacitance of the data line capacitor of the corresponding data lines.

4. The liquid crystal display device according to claim 1, wherein a capacitance of each one of the storage capacitors is about 1000 times smaller than a capacitance of each one of the tank capacitors of the corresponding data line.

5. The liquid crystal display device according to claim 1, further comprising a data driver connected to the data lines and a gate driver connected to the gate lines.

6. The liquid crystal display device according to claim 1, wherein the tank capacitors are electrically separated from the storage capacitors.

7. The liquid crystal display device according to claim 1, wherein a capacitance of each tank capacitor is substantially larger than a capacitance of the data line capacitor of the corresponding data lines.

8. A liquid crystal display device, comprising:
a color filter substrate;
a thin film transistor substrate, the thin film transistor substrate defining a plurality of pixel regions arranged in a matrix form, each pixel region associated with:
a thin film transistor having a gate electrode, a source electrode and a drain electrode,
a data line connected to the source electrode of the thin film transistor,
a gate line connected to the gate electrode of the thin film transistor,
a storage capacitor connected to the drain electrode of the thin film transistor,
a data line capacitor connected to the data line,
a first switch connected to the data line,
a tank capacitor connected to the first switch, and
a common voltage supply connected to the tank capacitor between the tank capacitor and the switch;
a common voltage transmission line connected to the common voltage supply of each pixel region;
a second switch directly connected to the common voltage transmission line; and
a liquid crystal material disposed between color filter substrate and the thin film transistor substrates,
wherein each column of the matrix form is associated with one data line, each row of the matrix form is associated with one gate line, and one tank capacitor is provided for each data line of each column of the matrix form with each tank capacitor being electrically separated from the respective storage capacitors.

9. The liquid crystal display device according to claim 8, wherein a capacitance of each tank capacitor is substantially larger than a capacitance of the data line capacitor of the corresponding data lines.

10. The liquid crystal display device according to claim 9, wherein a capacitance of each tank capacitor is about 50 times larger than a capacitance of the data line capacitor of the corresponding data lines.

11. A liquid crystal display device, comprising:
a color filter substrate;
a thin film transistor substrate, the thin film transistor substrate defining a plurality of pixel regions arranged in a matrix form, each pixel region associated with:
a thin film transistor having a gate electrode, a source electrode and a drain electrode,
a data line connected to the source electrode of the thin film transistor,
a gate line connected to the gate electrode of the thin film transistor,
a storage capacitor connected to the drain electrode of the thin film transistor,
a data line capacitor connected to the data line,
a first switch connected to the data line,
a tank capacitor connected to the first switch, and
a common voltage supply connected to the tank capacitor between the tank capacitor and the switch; and
a liquid crystal material disposed between color filter substrate and the thin film transistor substrates,
wherein each column of the matrix form is associated with one data line, each row of the matrix form is associated with one gate line, and one tank capacitor is provided for each data line of each column of the matrix form with each tank capacitor being electrically separated from the respective storage capacitors, and
wherein a capacitance of each tank capacitor is about 50 times larger than a capacitance of the data line capacitor of the corresponding data line.

* * * * *